US009525840B2

(12) United States Patent
Yamada et al.

(10) Patent No.: US 9,525,840 B2
(45) Date of Patent: Dec. 20, 2016

(54) IMAGE PROJECTION APPARATUS AND CIRCUIT-BOARD RETAINING STRUCTURE

(71) Applicants: Masamichi Yamada, Kanagawa (JP); Tetsuya Fujioka, Kanagawa (JP); Naoyuki Ishikawa, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP)

(72) Inventors: Masamichi Yamada, Kanagawa (JP); Tetsuya Fujioka, Kanagawa (JP); Naoyuki Ishikawa, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 399 days.

(21) Appl. No.: 14/291,241

(22) Filed: May 30, 2014

(65) Prior Publication Data
US 2015/0002828 A1 Jan. 1, 2015

(30) Foreign Application Priority Data

Jun. 26, 2013 (JP) ................................. 2013-134362

(51) Int. Cl.
*H04N 5/74* (2006.01)
*G03B 21/14* (2006.01)
(Continued)

(52) U.S. Cl.
CPC ............ *H04N 5/7475* (2013.01); *G03B 21/14* (2013.01); *G03B 21/145* (2013.01);
(Continued)

(58) Field of Classification Search
CPC ........... G03B 21/00; G03B 21/14; H04N 5/74; H04N 9/31; H05K 1/14; H05K 7/14; H05K 9/00
See application file for complete search history.

(56) References Cited

U.S. PATENT DOCUMENTS

2007/0126997 A1* 6/2007 Kang ................... G03B 21/005
353/99
2007/0242235 A1 10/2007 Ohno
(Continued)

FOREIGN PATENT DOCUMENTS

CN 2613789 Y 4/2004
CN 101334948 A 12/2008
(Continued)

OTHER PUBLICATIONS

Extended Search Report issued Dec. 5, 2014 in European Patent Application No. 14170077.3.
(Continued)

*Primary Examiner* — Sultan Chowdhury
*Assistant Examiner* — Danell L Owens
(74) *Attorney, Agent, or Firm* — Oblon, McClelland, Maier & Neustadt, L.L.P.

(57) ABSTRACT

According to an embodiment of the invention, an image projection apparatus includes: a light source device; a first circuit board including an image display device configured to form an image using light, a connector, and an electrically conductive portion near the connector; a retaining member made of metal; an optical illuminating unit held by the retaining member and configured to guide the light to the image display device; an optical projecting unit configured to project the image onto a projection surface; a second circuit board configured to be electrically connected to the connector; a metal plate fixed and electrically connected to the retaining member; and an elastic metal member arranged on the metal plate. The first circuit board is fixed to the retaining member. The elastic metal member is in contact (Continued)

with the electrically conductive portion. The second circuit board is fixed and electrically connected to the metal plate.

5 Claims, 16 Drawing Sheets

(51) Int. Cl.
    *H04N 9/31*     (2006.01)
    *G03B 21/28*     (2006.01)

(52) U.S. Cl.
    CPC ........... *G03B 21/147* (2013.01); *G03B 21/28* (2013.01); *H04N 5/7458* (2013.01); *H04N 9/3114* (2013.01); *H04N 9/3141* (2013.01)

(56) References Cited

U.S. PATENT DOCUMENTS

2009/0002594 A1     1/2009   Okumura et al.
2010/0225847 A1     9/2010   Okumura et al.

FOREIGN PATENT DOCUMENTS

| EP | 1 845 719 A1 | 10/2007 |
| JP | 02-161798 | 6/1990 |
| JP | 11-274768 A | 10/1999 |
| JP | 2006-222341 | 8/2006 |
| JP | 2006-317835 | 11/2006 |
| JP | 2006-339361 | 12/2006 |
| JP | 2007-240769 | 9/2007 |
| JP | 2007-316674 | 12/2007 |
| JP | 4768832 | 6/2011 |
| JP | 2012-93557 A | 5/2012 |

OTHER PUBLICATIONS

Combined Office Action and Search Report issued Aug. 4, 2015 in Chinese Patent Application No. 201410283813.6 (with English language translation).

* cited by examiner

IMAGE PROJECTION APPARATUS AND CIRCUIT-BOARD RETAINING STRUCTURE

CROSS-REFERENCE TO RELATED APPLICATIONS

The present application claims priority to and incorporates by reference the entire contents of Japanese Patent Application No. 2013-134362 filed in Japan on Jun. 26, 2013.

BACKGROUND OF THE INVENTION

1. Field of the Invention

The present invention relates generally to image projection apparatuses and circuit-board retaining structures.

2. Description of the Related Art

Some types of image projection apparatuses project an image onto a projection surface such as a screen by directing light from a light source to an image display device, such as a liquid crystal panel or a digital micro-mirror device (DMD), and projecting light modulated by the image display device according to the image onto the projection surface. To perform image projection in this manner, such an image projection apparatus includes at least a circuit board on which an image display device mounted and a control circuit board configured to control the image display device and the like. These circuit boards are electrically connected to each other via a connector.

There is a demand for projectors as image projection apparatuses to accomplish projecting a large screen image while minimizing projection space required outside the projector. To increase a projection screen size while reducing projection space outside an image projection apparatus, it is desirable to place as large a portion of an optical path of imaging light which forms an image to be projected as possible inside the projector. An image projection apparatus including such an optical system is disclosed in Japanese Patent No. 4210314. Adopting such an optical system allows reducing projection space outside an image projection apparatus and, furthermore, reducing a volume size of the image projection apparatus. However, a problem can arise when an image projection apparatus including an image display device such as a DMD is used. This type of image projection apparatus typically has the following configuration: a DMD circuit board including the image display device is positioned horizontally; and a main circuit board which controls the image projection apparatus is positioned vertically and connected to the DMD circuit board via a connector. If electrical noise is undesirably generated at a portion near the connector, a shield structure will be added to the image projection apparatus to prevent external leakage of the noise. As a result, even though the volume size of the image projection apparatus can be reduced by virtue of the optical system configuration described above, addition of the shield structure increases the apparatus in size.

Japanese Laid-open Patent Publication No. 02-161798 discloses a structure for reducing noise of a main circuit board and a sub circuit board connected to each other via a connector. In this structure, the main circuit board and the sub circuit board are arranged parallel to each other and each of the circuit boards is ground connected to a chassis interposed therebetween.

However, an image display device such as a DMD and other circuit boards are typically arranged perpendicular to each other.

In view of the above circumstances, there is a need to provide an image projection apparatus which generates less electrical noise than conventional image projection apparatuses.

It is an object of the present invention to at least partially solve the problem in the conventional technology.

SUMMARY OF THE INVENTION

It is an object of the present invention to at least partially solve the problems in the conventional technology.

According to the present invention, there is provided an image projection apparatus for projecting an image onto a projection surface, the image projection apparatus comprising: a light source device configured to emit light; a first circuit board including an image display device configured to form an image using the light, a connector, and an electrically conductive portion near the connector; a retaining member made of metal; an optical illuminating unit held by the retaining member and configured to guide the light emitted from the light source device to the image display device; an optical projecting unit configured to project the image formed by the image display device onto the projection surface; a second circuit board configured to be electrically connected to the connector of the first circuit board; a metal plate fixed and electrically connected to the retaining member; and an elastic metal member arranged on the metal plate, wherein the first circuit board is fixed to the retaining member, the elastic metal member is in contact with the electrically conductive portion of the first circuit board, and the second circuit board is fixed and electrically connected to the metal plate.

The present invention also provides a circuit-board retaining structure comprising: a first circuit board (42) including an image display device (41) configured to form an image using light, a connector (42a), and an electrically conductive portion (45, 46) near the connector (42a); a retaining member (56) made of metal; a second circuit board (80) configured to be electrically connected to the connector (42a) of the first circuit board (42); a metal plate (70) fixed and electrically connected to the retaining member (56); and an elastic metal member (73, 74) arranged on the metal plate (70), wherein the first circuit board (42) is fixed to the retaining member (56), the elastic metal member (73, 74) is in contact with the electrically conductive portion (45, 46) of the first circuit board (42), and the second circuit board (80) is fixed and electrically connected to the metal plate (70).

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
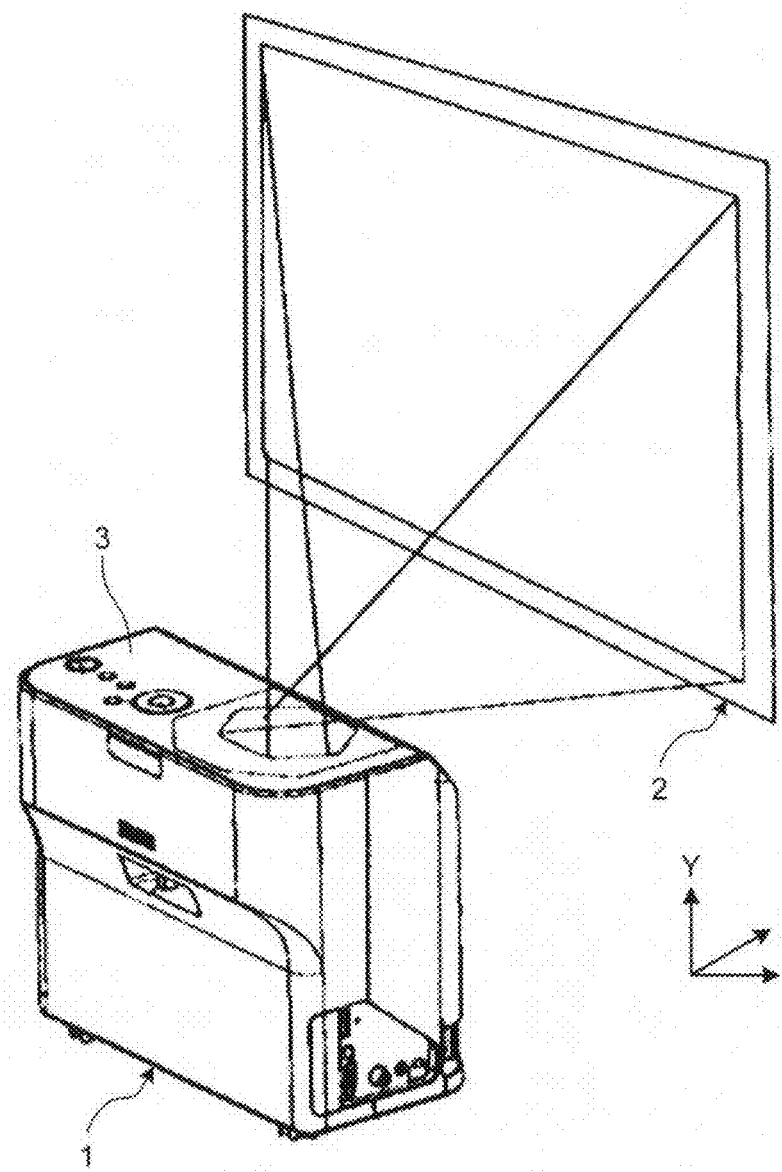
FIG. 1 is a perspective view illustrating a use situation of an image projection apparatus according to a first embodiment of the present invention.

Exemplary embodiments of the present invention are described in detail below with reference to the accompanying drawings. FIG. 1 is an exterior perspective view of an image projection apparatus 1 according to an embodiment of the present invention. The image projection apparatus 1 forms an image based on image data fed from a personal computer, a video camera, or the like, and projects and displays the image onto a screen 2. Examples of the image projection apparatus 1 include liquid crystal projectors which are widely known. Liquid crystal projectors have become improved in brightness and less expensive by virtue of recent efficiency enhancement of light source lamps. Compact and lightweight image projection apparatuses with digital micro-mirror devices (DMDs) are proliferating not only in offices and schools but also for home use. In particular, front projectors which are improved in portability are coming into extensive use, including in small meetings of several members.

Figure 2:
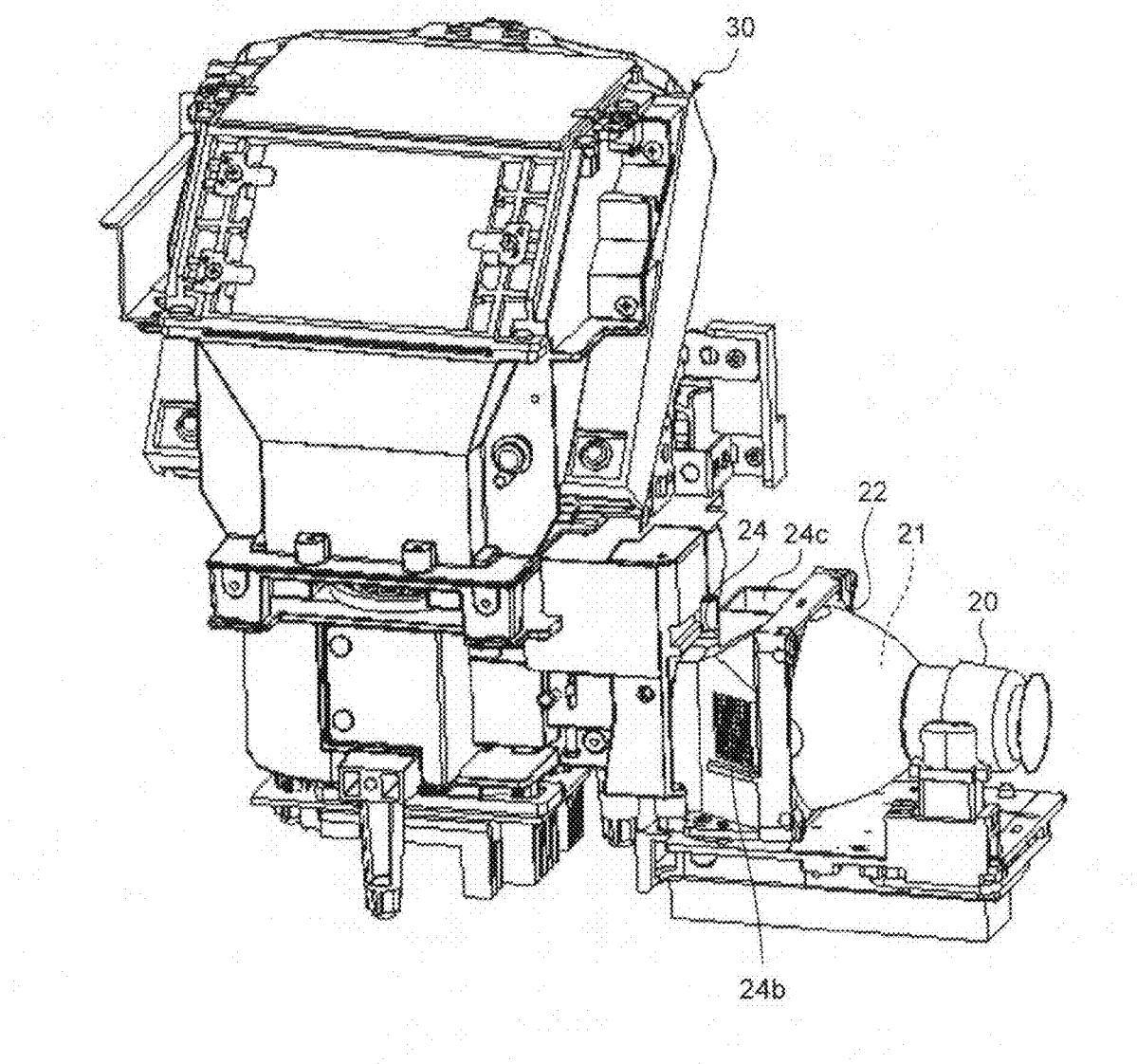
FIG. 2 is a perspective view of an optical engine unit and a light source device of the image projection apparatus shown in FIG. 1.

FIG. 2 is a perspective view of the image projection apparatus 1 illustrated in FIG. 1 with an outer casing 3 removed. As illustrated in FIG. 2, the image projection apparatus 1 primarily includes an optical engine unit 30 and a light source device 20. The light source device 20 supplies white light necessary for image projection to the optical engine unit 30 by controlling a light source such as a high-pressure mercury lamp.

The light source device 20 includes a light source bracket 22 as a holding member which supports a light source 21 such as a halogen lamp, a metal halide lamp, or a high-pressure mercury lamp. The light source 21 is mounted at an upper portion of the light source bracket 22. A holder 24, which holds a reflector and the like (not shown), is screwed into the light source bracket 22 on a side from which light from the light source 21 exits. The holder 24 has, on the side opposite from the light source 21, an exit window 23 (see FIG. 3). The light exiting from the light source 21 is converged to the exit window 23 by the reflector (not shown) and goes out through the exit window 23. The holder 24 further has, on its side surface, a light-source air-inlet opening 24b, through which air for cooling the light source 21 is to flow in. The holder 24 further has, on its top surface, a light-source air-outlet opening 24c, through which air heated by the light source 21 is to exit.

Figure 3:
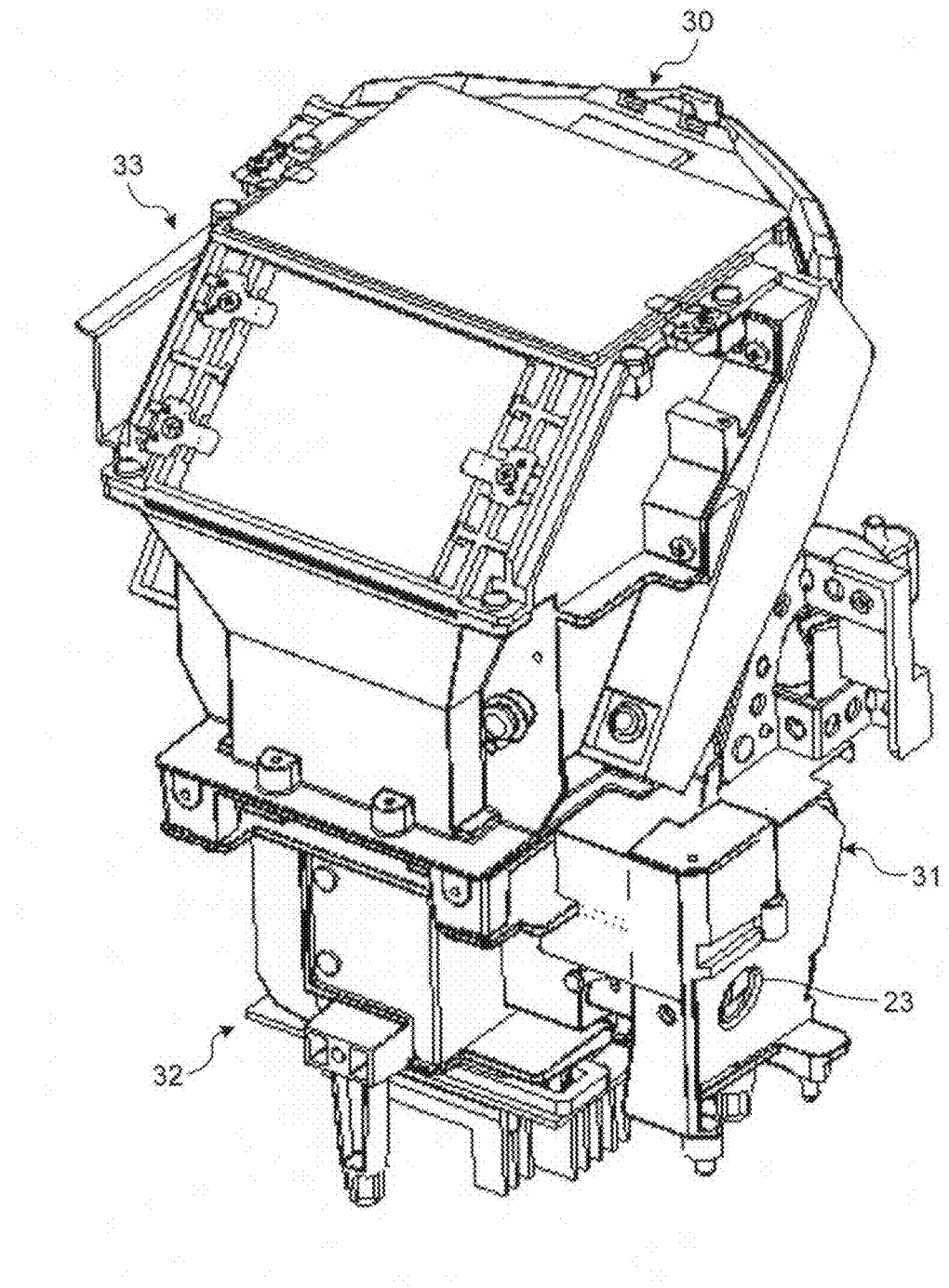
FIG. 3 is a perspective view of the optical engine unit of the image projection apparatus.

The optical engine unit 30 provides control of processing light supplied from the light source device 20 according to input image data and projecting the processed light. FIG. 3 is a schematic perspective view illustrating a configuration of the optical engine unit 30 in detail. The optical engine unit 30 includes an optical illuminating unit 31, and optical projecting unit 33, and an image processing unit 32. The white light from the light source device 20 described above is directed to the optical illuminating unit 31. The optical illuminating unit 31 separates the white light emitted from the light source device 20 into red, green, and blue (RGB) components, and guides the components to the image processing unit 32. The image processing unit 32 forms an image according to modulation signals. The optical projecting unit 33 projects and magnifies the image formed by the image processing unit 32.

Figure 4:
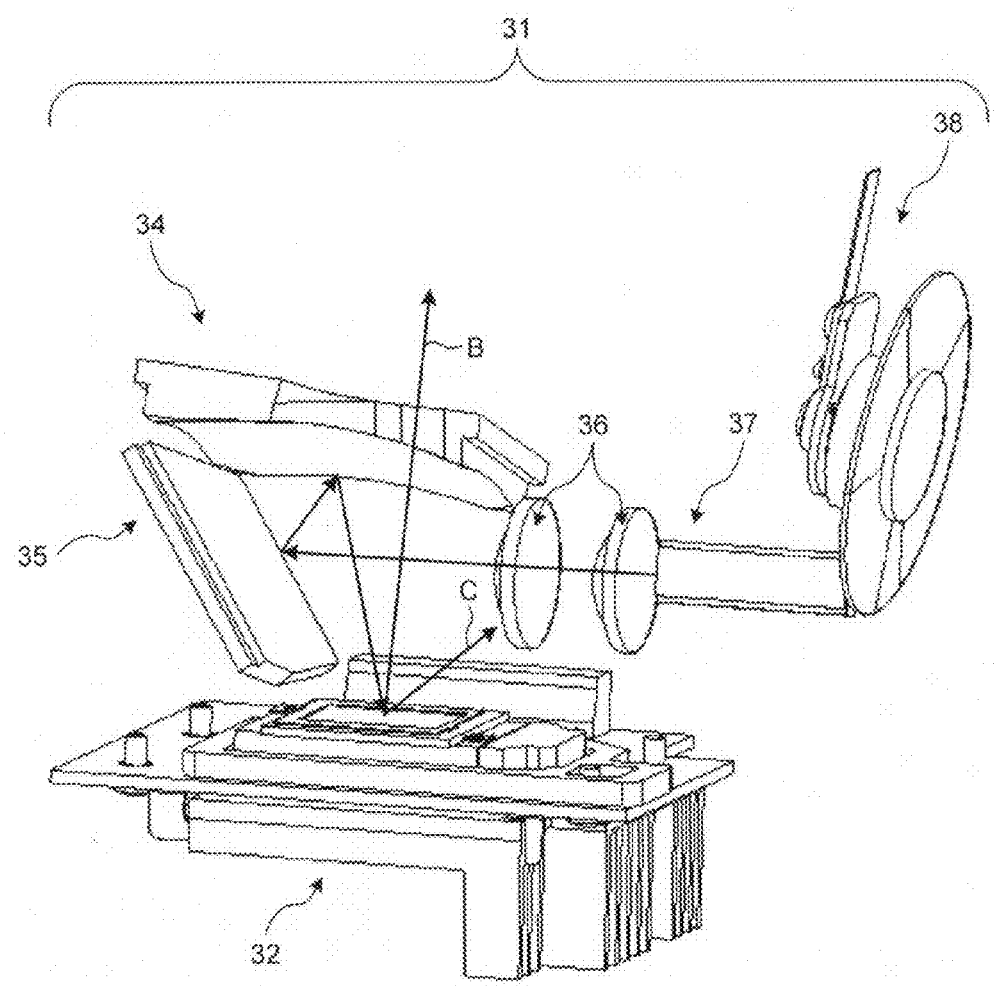
FIG. 4 is a perspective view of an optical illuminating unit and an image processing unit of the image projection apparatus.

FIG. 4 is a diagram illustrating a layout of the optical illuminating unit 31 and the image processing unit 32. The optical illuminating unit 31 includes a color wheel 38, a light tunnel 37, a relay lens 36, a cylindrical mirror 35, and a concave mirror 34. The color wheel 38, which includes a disc-like color filter, converts the white light emitted from the light source device 20 into light of one of R, G, and B every unit time using the color filter and emits the converted light. The light tunnel 37 is formed by joining plate glasses together into a cylindrical shape. The light tunnel 6 guides the light exiting from the color wheel 38 to the relay lens 36. The relay lens 36 is formed by combining two lenses and converges the light exiting from the light tunnel 37 while correcting axial chromatic aberration.

The cylindrical mirror 35 and the concave mirror 34 reflect the light exiting from the relay lens 36. The reflected light enters the image processing unit 32. The image processing unit 32 includes a DMD (an example of an image display device) 41 (see FIG. 5) which includes a substantially-rectangular mirror surface made up of a plurality of micromirrors. The DMD 41 processes and reflects projection light so as to form a desired image by driving (i.e., repositioning) the micromirrors individually in a time-division manner according to image data. In the image processing unit 32, light for use by the plurality of micromirrors of the DMD 41 in the time-division manner according to the image data is reflected toward a projector lens 51 in a direction indicated by arrow B in FIG. 4, while unnecessary light is reflected toward a light sink in a direction indicated by arrow C.

Figure 5:
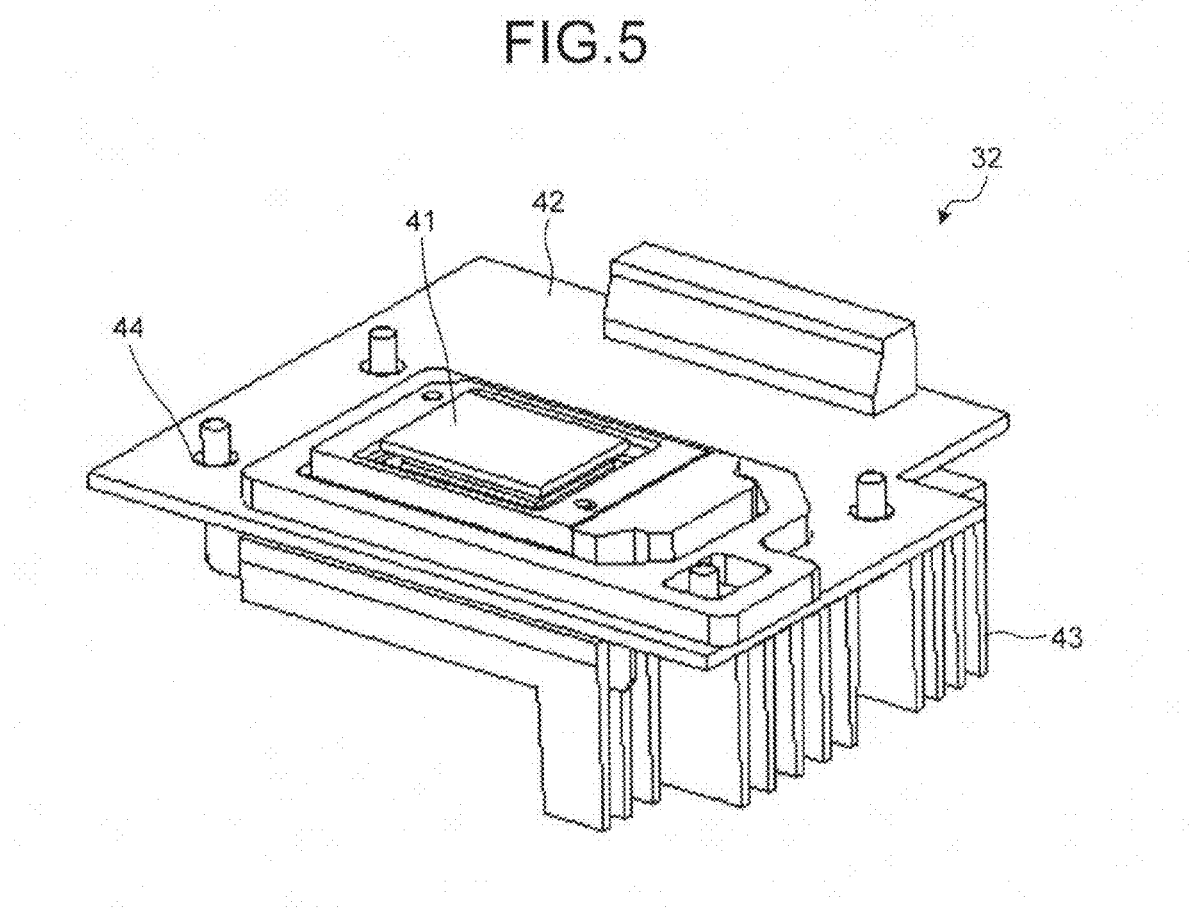
FIG. 5 is a perspective view of the image processing unit of the image projection apparatus.
Figure 6:
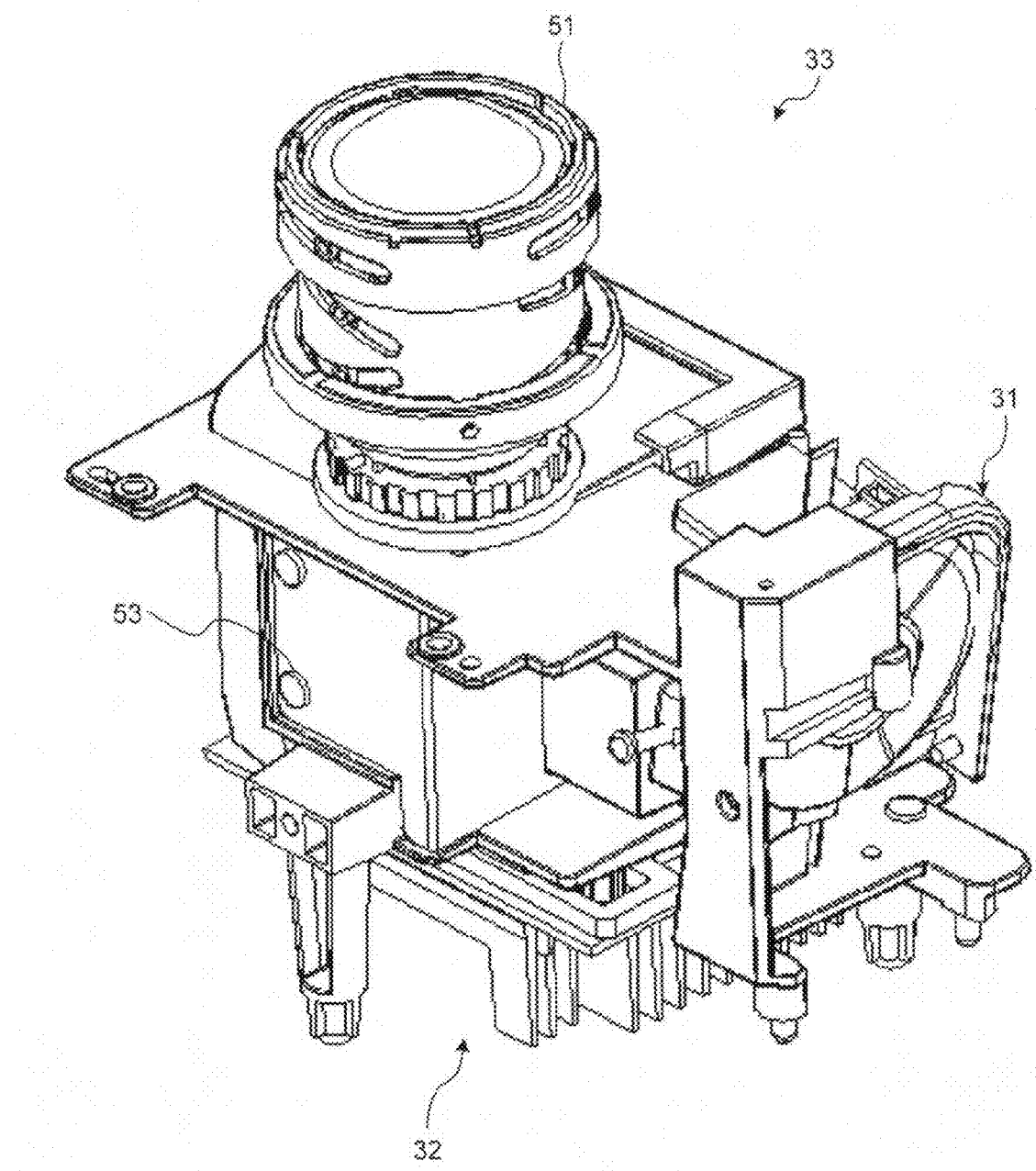
FIG. 6 is a perspective view of an optical projecting unit of the image projection apparatus.

FIG. 5 is a perspective view illustrating a configuration of the image processing unit 32. The image processing unit 32 includes the DMD 41, a DMD printed circuit board (hereinafter, "DMD PCB") 42 (first circuit board) which controls the DMD 41, a heat sink 43 which cools the DMD 41, and a fixing plate 44 which presses the heat sink 43 against the DMD 41. In this embodiment, the heat sink 43 serves as a heat dissipating unit. The heat sink 43 is brought into contact with the to-be-cooled DMD 41 to thereby dissipate heat emitted from the DMD 41. FIG. 6 is a perspective view illustrating a configuration of the optical projecting unit 33 in detail. The light exiting from the image processing unit 32 is reflected toward the projector lens 51 illustrated in FIG. 7. The unnecessary light is reflected toward the light sink 53 illustrated in FIG. 7.

Figure 7:
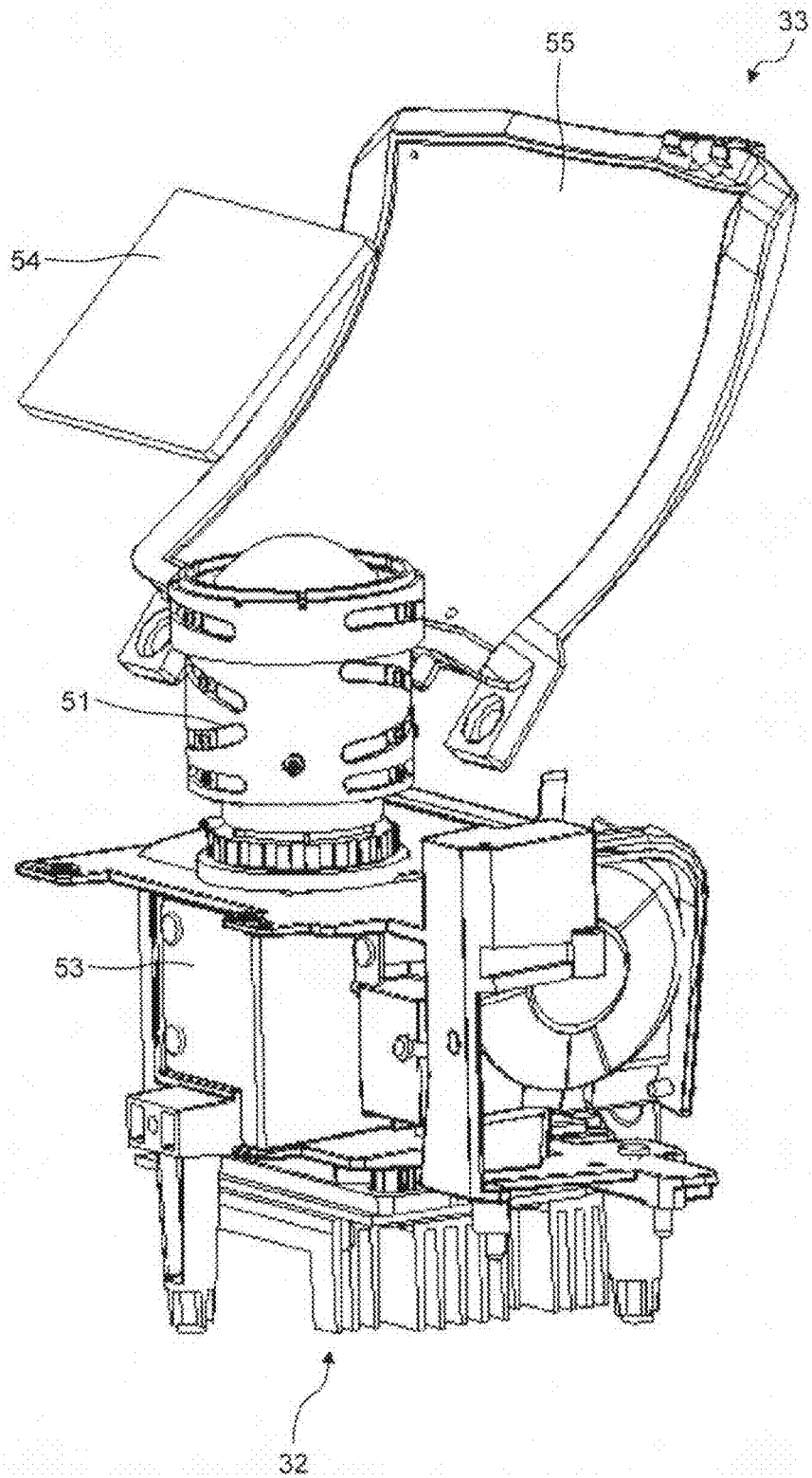
FIG. 7 is a perspective view of the optical projecting unit of the image projection apparatus.
Figure 8:
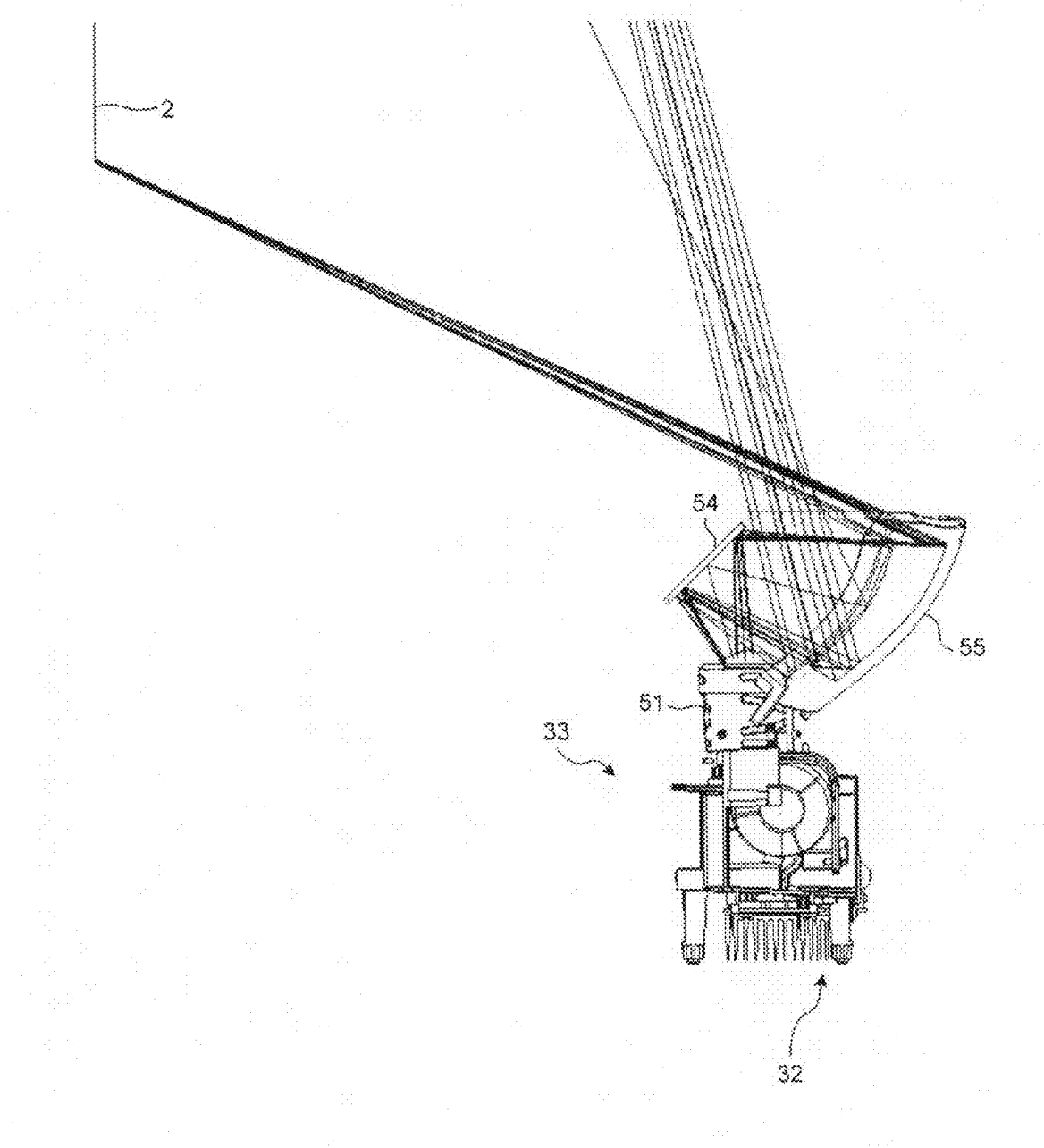
FIG. 8 is a side view of the optical projecting unit of the image projection apparatus.

FIG. 7 and FIG. 8 are a perspective view and a side view, respectively, illustrating the configuration of the optical projecting unit 33. Magnified image light exiting from the projector lens 51 travels along an optical path which is folded by a folding mirror 54. The light is then reflected off a free-form mirror 55 to project and magnify the image on the screen 2. Because the configuration described above allows placing the optical engine unit 30 in proximity to the screen 2, the image projection apparatus 1 can be designed to have a compact, upright structure, in which elements are vertically stacked, requiring a smaller footprint.

Figure 9A:
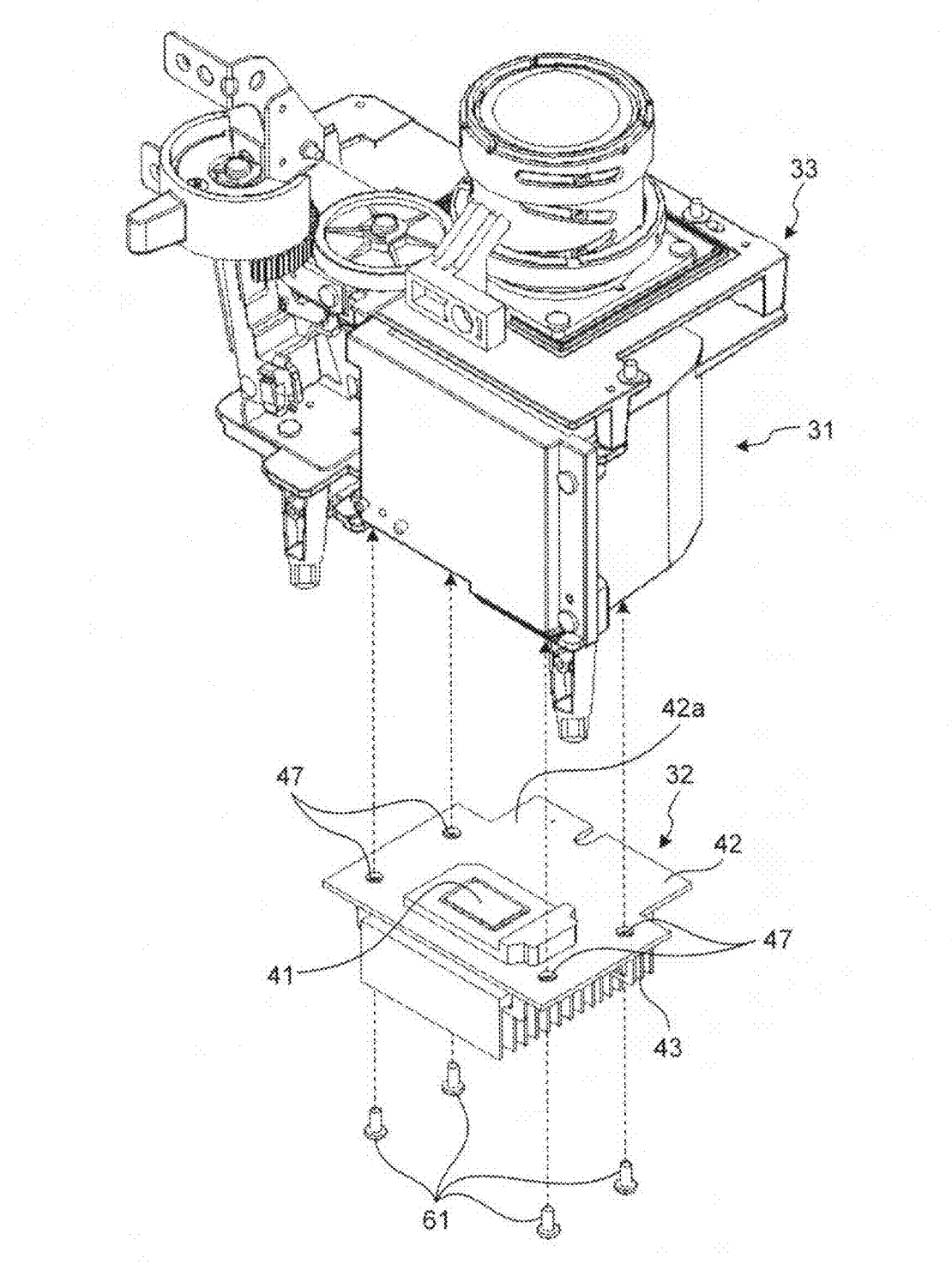
FIG. 9A is a diagram illustrating a method for assembling the image processing unit onto the optical illuminating unit of the image projection apparatus.
Figure 9B:
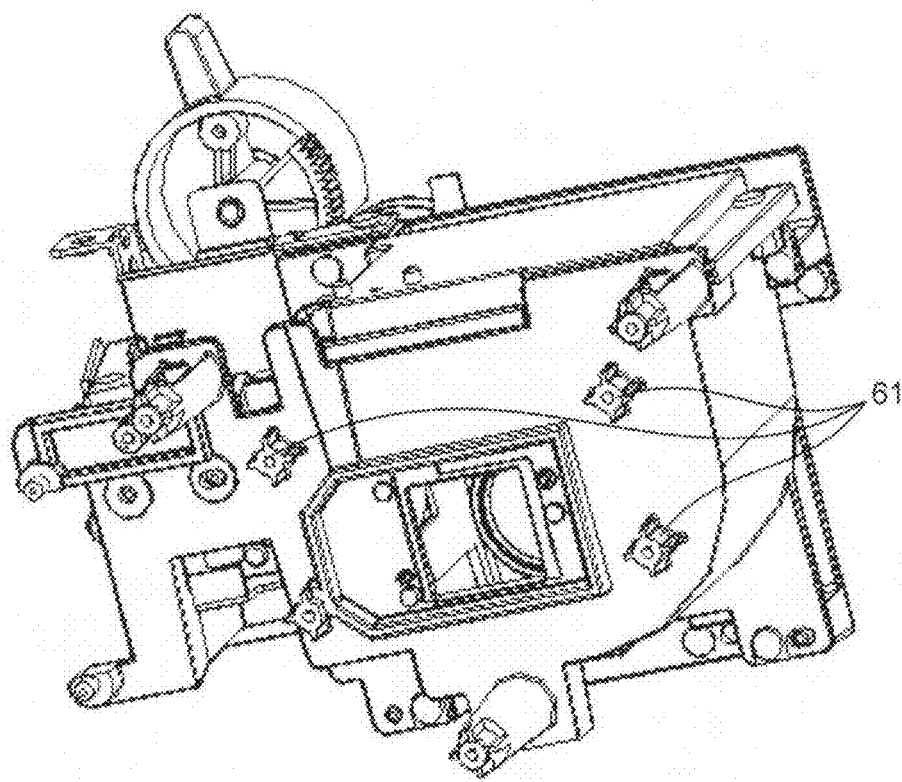
FIG. 9B is another diagram illustrating the method for assembling the image processing unit onto the optical illuminating unit of the image projection apparatus.

FIGS. 9A and 9B are diagrams illustrating a method for assembling the image processing unit 32 onto the optical illuminating unit 31. As illustrated in FIGS. 9A and 9B, the DMD PCB 42 including the DMD 41 is fastened in a horizontal orientation to the optical illuminating unit 31 by inserting screws 61 into holes 47 at four positions near the DMD 41 with the DMD 41 at substantially their center. The reason for adopting this assembly method is as follows. The DMD 41 is one of main optical elements and therefore positional accuracy of the DMD 41 with respect to the optical illuminating unit 31 matters considerably. To accurately position and horizontally orient the DMD 41 with respect to the optical illuminating unit 31, the configuration of screwing the DMD 41 at the four positions near the DMD 41 with the DMD 41 at substantially their center is functionally favorable. However, a large portion of electrical noise originates near a connector 42a for connection with a control circuit board (second circuit board) 80 (see FIGS. 14A and 14B), which will be described later, rather than near the DMD 41.

Figure 10:
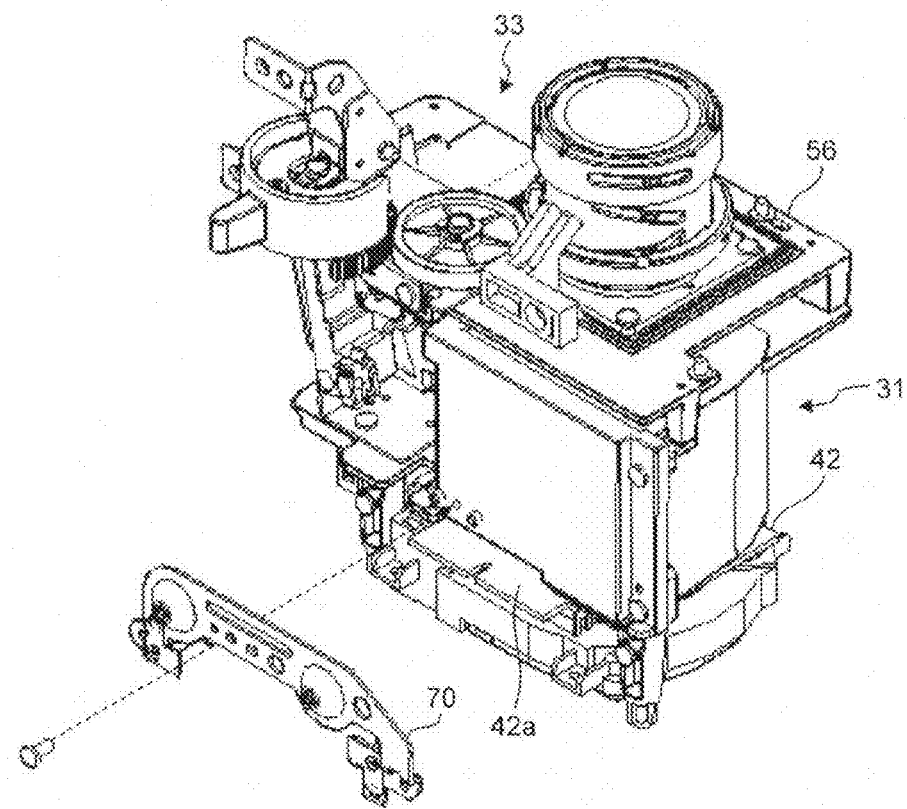
FIG. 10 is a diagram illustrating a method for providing electrical ground connection to a DMD Print Circuit Board (PCB)
Figure 11:
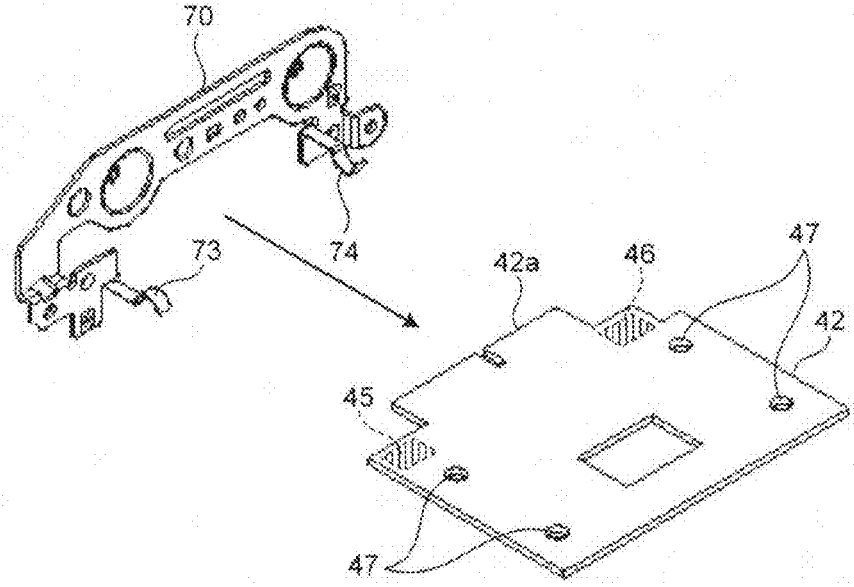
FIG. 11 is another diagram illustrating the method for providing electrical ground connection to the DMD PCB.

FIGS. 10 and 11 are diagrams describing a method for providing electrical ground connection to the DMD PCB 42. A metal earth plate 70 is fixed to the optical illuminating unit 31 in a fashion illustrated in FIGS. 10 and 11. Metal leaf-spring members 74 and 73, which are elastic members made of metal, are fixed to the metal earth plate 70. The metal leaf-spring members 74 and 73 differ from each other in urged direction. The metal leaf-spring member 73 is urged upward in FIG. 11, while the metal leaf-spring member 74 is urged downward in FIG. 11. The metal leaf-spring member 74 is placed on a back side of the DMD PCB 42 at a position near the connector 42a. The metal leaf-spring member 74 contacts a conductive portion 45 of the DMD PCB 42 where a resist (insulating) layer is stripped off, thereby making electrical ground connection between the metal earth plate 70 and the DMD PCB 42. The metal leaf-spring member 73 is on a front side of the DMD PCB 42 at a position near the connector 42a. The metal leaf-spring member 73 contacts a conductive portion 46 of the DMD PCB 42 where the resist (insulating) layer is stripped off, thereby making electrical ground connection between the metal earth plate 70 and the DMD PCB 42. The conductive portion 46 is positioned on the DMD PCB 42 to be closer to the connector 42a than the positions where the DMD PCB 42 is fixed to the optical illuminating unit 31. The elastic members are not limited to those of this embodiment. Any elastic members having elasticity and configured to be brought into contact with the conductive portions 45 and 46 can be employed.

Figure 12A:
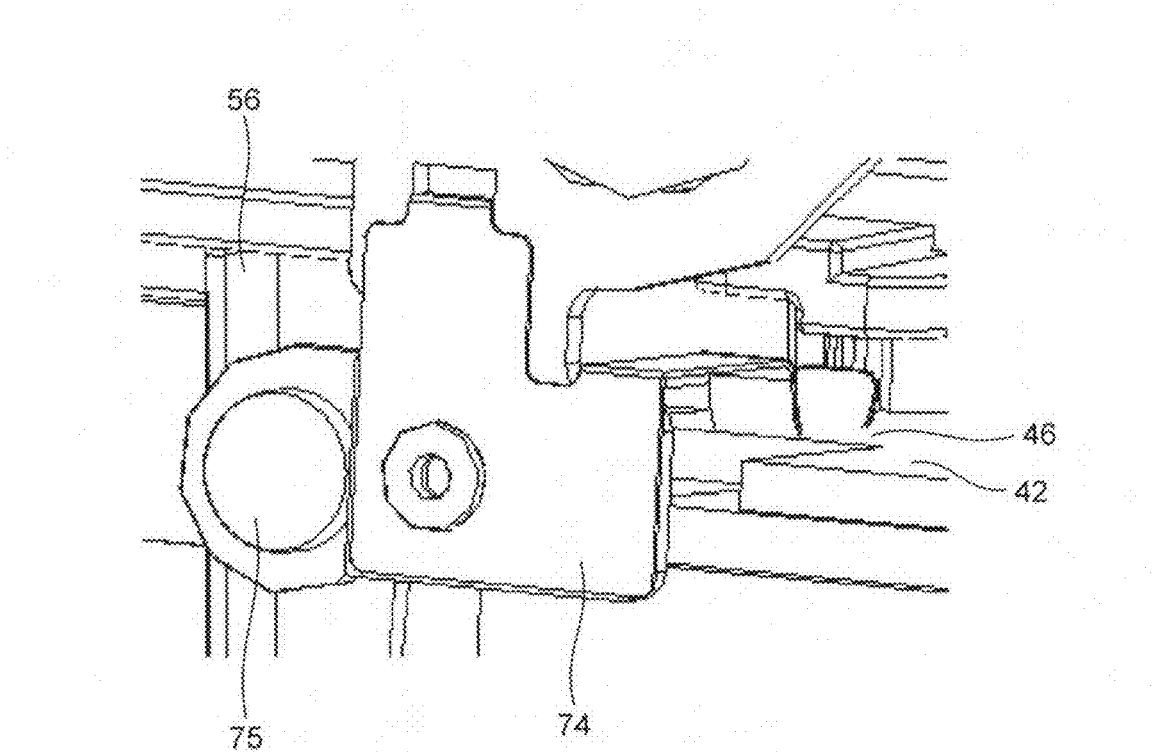
FIG. 12A is a diagram illustrating a metal leaf-spring member and a conductive portion in contact with each other of the image projection apparatus.
Figure 12B:
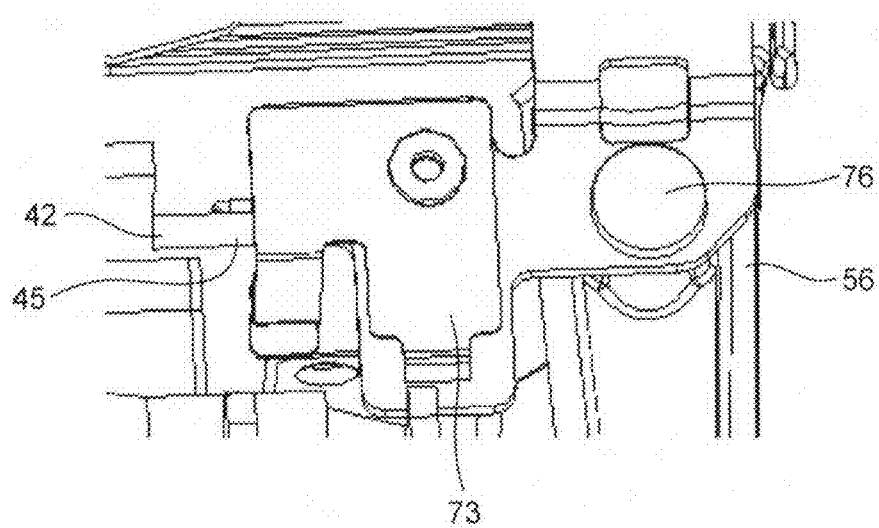
FIG. 12B is a diagram illustrating a metal leaf-spring member and a conductive portion in contact with each other of the image projection apparatus.

FIG. 12A and FIG. 12B are diagrams illustrating the metal leaf-spring member 74 and the conductive portion 46 in contact with each other and the metal leaf-spring member 73 and the conductive portion 45 in contact with each other, respectively. As illustrated in FIGS. 12A and 12B, the metal earth plate 70 is fastened to a metal member (made of Mg alloy) 56 of the optical illuminating unit 31 with a screw 75 and a screw 76. The metal member 56 is a retaining member such as a bracket which supports components of the optical illuminating unit 31. The metal leaf-spring members 74 and 73 are fixed to the metal earth plate 70 at different positions. One of the metal leaf-spring members 74 and 73 is in contact with the conductive portion 46 at the position near the connector 42a on the front face of the DMD PCB 42. The other one of the metal leaf-spring members 74 and 73 is in contact with the conductive portion 45 at the position near the connector 42a on the back face of the DMD PCB 42. The shapes of the metal leaf-spring members 74 and 73 are not limited to those of this embodiment. Alternatively, the metal leaf-spring members 74 and 73 may be configured to have two or more projections tops of which are to be brought into contact with the conductive portion 45 or 46 so that a contact area can be increased. Meanwhile, each of the metal leaf-spring members 74 and 73 is fixed to the metal earth plate 70 by being crimped at a flange. The metal leaf-spring members 74 and 73 arranged at the different, or two, positions are identical components which are fixed with one of them in an upside-down orientation. Adopting such configuration of the metal leaf-spring members 74 and 73 allows cost saving by not increasing variety of dies.

Figure 13A:
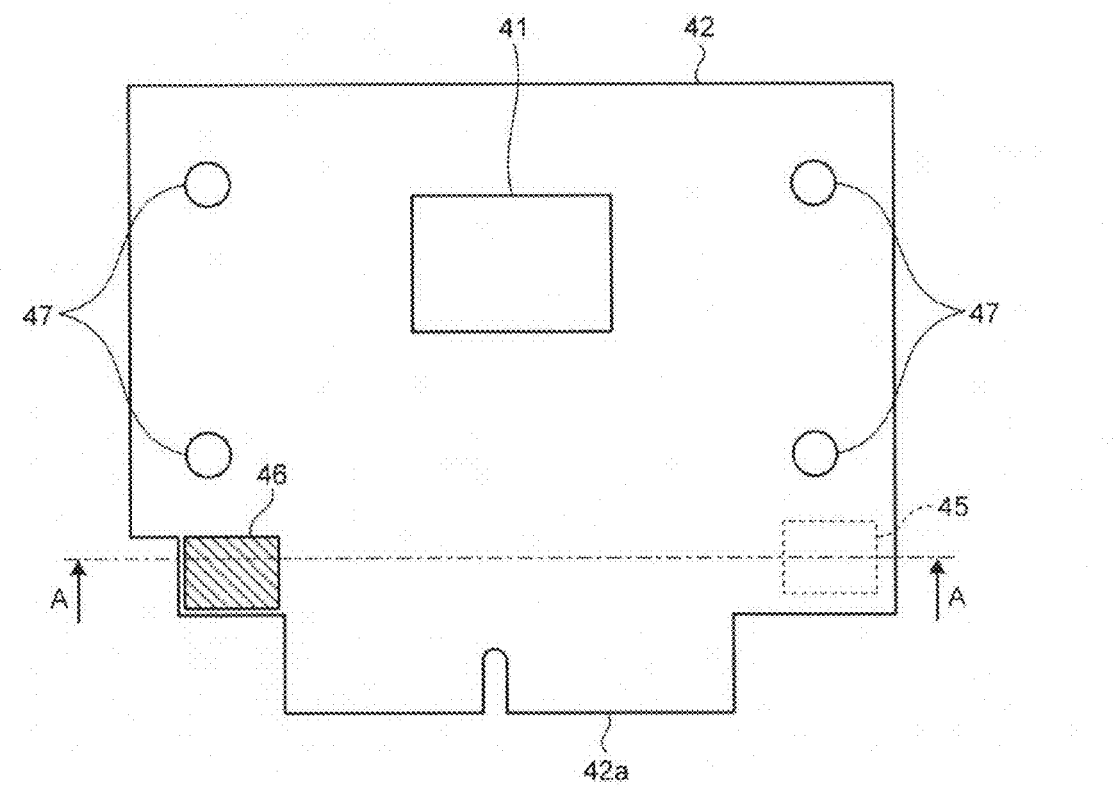
FIG. 13A is a configuration diagram of a front side of the DMD PCB including a DMD of the image projection apparatus.
Figure 13B:
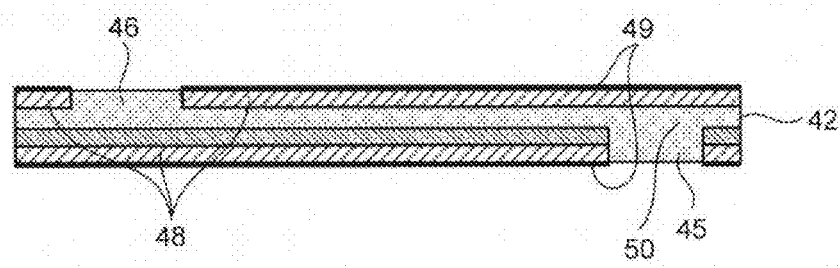
FIG. 13B is a cross-sectional view taken in the direction of arrows A-A of the DMD PCB including the DMD of the image projection apparatus.

FIGS. 13A and 13B illustrate a configuration of the DMD PCB 42 including the DMD 41. The DMD PCB 42 has a four-layer structure, in which each of the entire first layer and the entire fourth layer is covered with a resist (insulating) layer 49. A ground layer 50 is laid on an inner side of the resist layers 49. The resist layers 49 are stripped off to expose the ground layer 50 at the conductive portions 45 and 46. Pattern layers 48 are laid between the resist layers 49 and the ground layer 50. Making ground connection of the DMD PCB 42 by contact the conductive portions 45 and 46 with the metal leaf-spring members 73 and 74 allows efficient reduction of electrical noise originating from the front face and the back face of the DMD PCB 42 near the connector 42a.

Figure 14A:
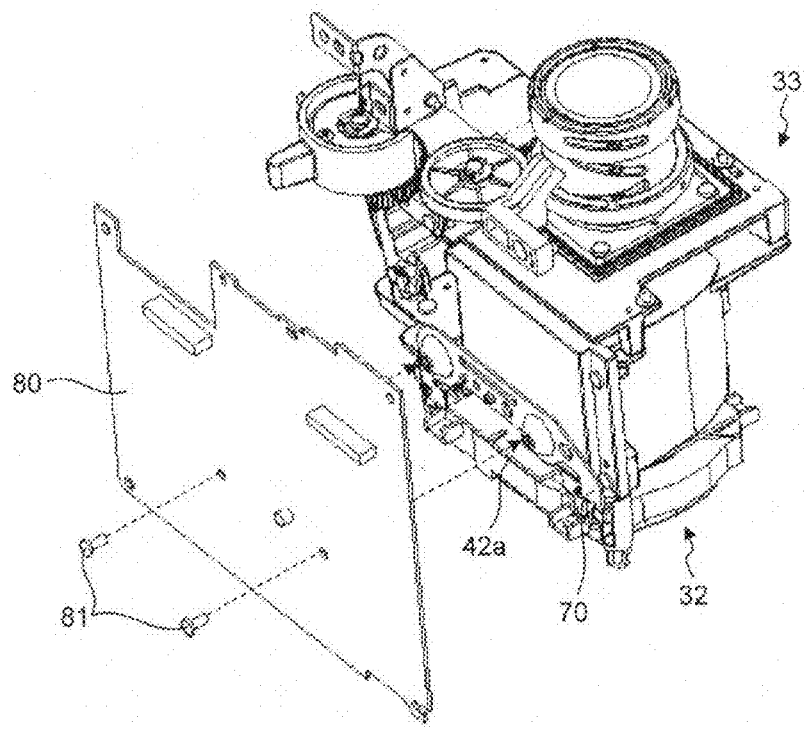
FIG. 14A is a diagram illustrating a method for assembling a control circuit board, which is to be connector-connected to the DMD PCB, of the image projection apparatus.
Figure 14B:
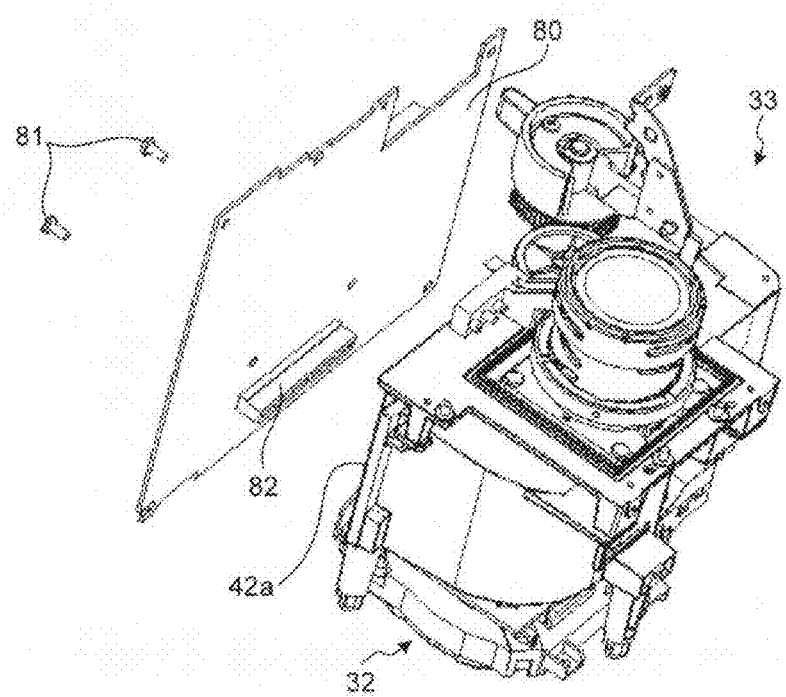
FIG. 14B is another diagram illustrating the method for assembling the control circuit board, which is to be connector-connected to the DMD PCB, of the image projection apparatus.

FIGS. 14A and 14B are diagrams illustrating a method for assembling a control circuit board 80 to the DMD PCB 42 with connector-connecting. The control circuit board 80 is connected to the DMD PCB 42 by connecting a connector 82 to the connector 42a. The control circuit board 80 is fastened to the metal earth plate 70 at two fixation positions near the connector 82 with screws 81.

Figure 15A:
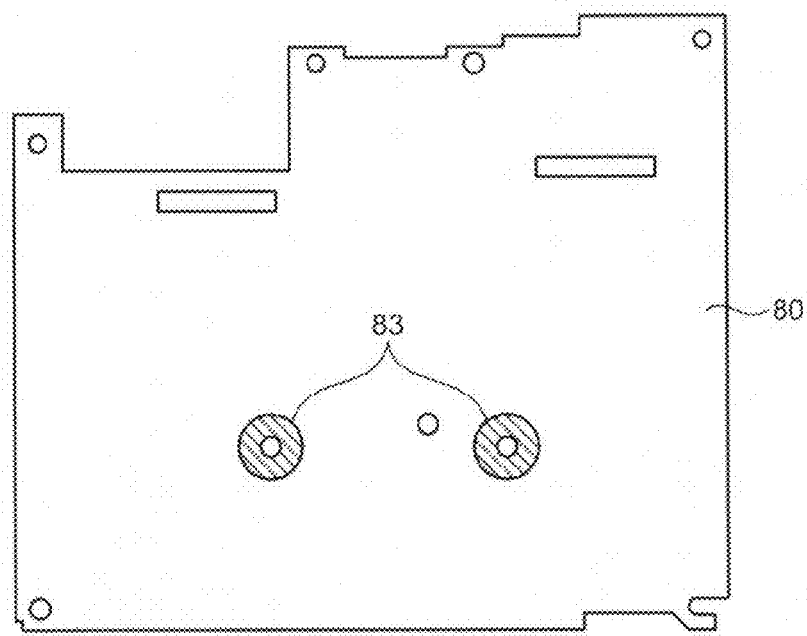
FIG. 15A is a configuration diagram of a front side of the control circuit board of the image projection apparatus.
Figure 15B:
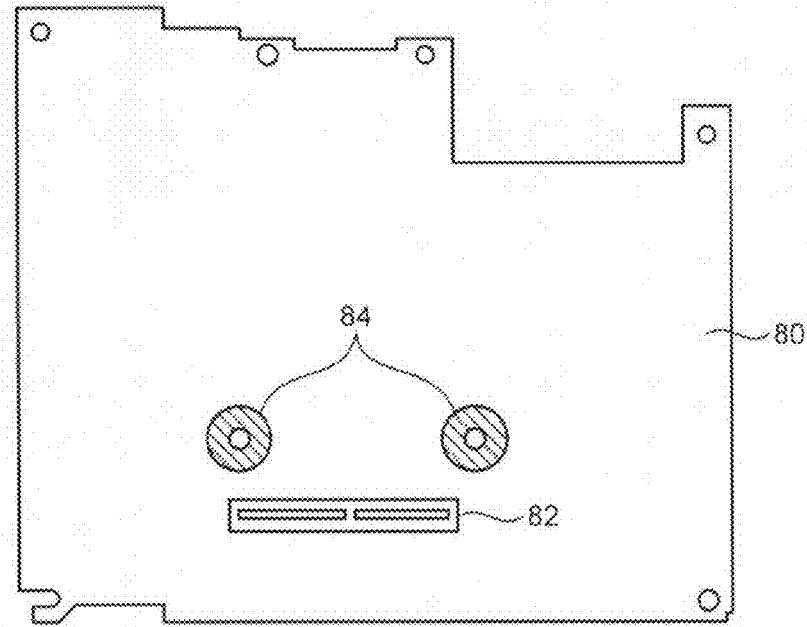
FIG. 15B is a configuration diagram of a back side of the control circuit board of the image projection apparatus.

FIGS. 15A and 15B illustrate a configuration of a front side and that of a back side, respectively, of the control circuit board 80. As illustrated in FIGS. 14A, 14B 15A, and 15B, the control circuit board 80 includes conductive portions 83 on the front side and conductive portions 84 and the back side formed by stripping off resist (insulating) layers at the fixation positions where the control circuit board 80 is fastened to the DMD PCB 42 with the screws 81. Ground connection to the metal earth plate 70 is made at the fixation positions.

According to the configuration of this embodiment described above, each of the DMD PCB 42 and the control circuit board 80 is ground connected to the metal earth plate 70, which includes the metal leaf-spring members 73 and 74, on each of the front side and the back side of the circuit board at the positions near the connector of the circuit board. Accordingly, electrical noise can be reduced efficiently.

Figure 16:
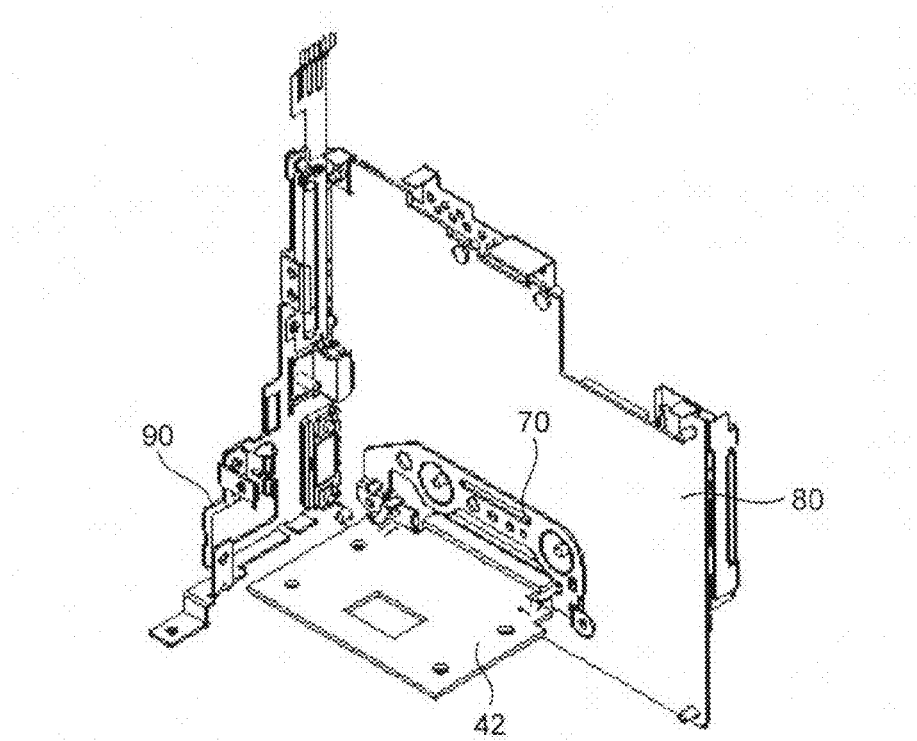
FIG. 16 is a diagram illustrating how other members are assembled onto the control circuit board.
Figure 17:
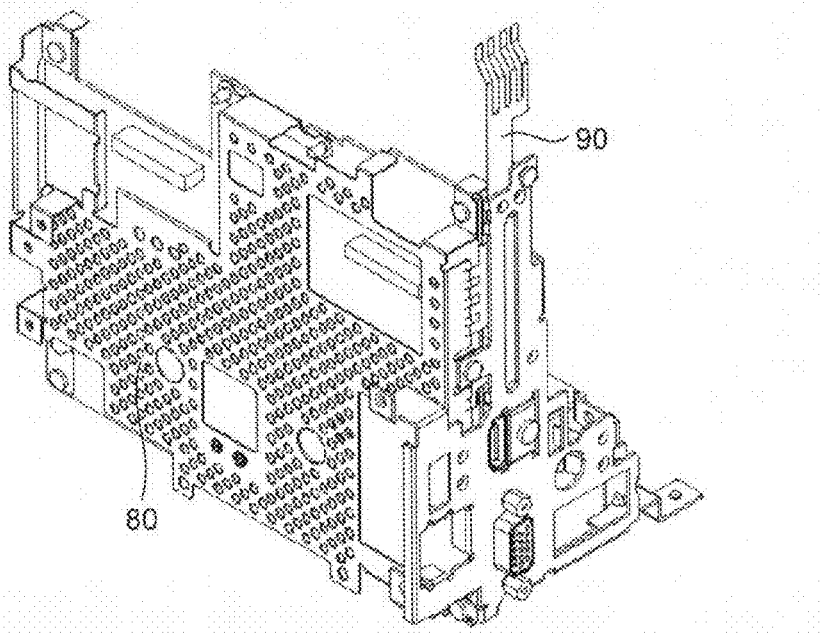
FIG. 17 is another diagram illustrating how the other members are assembled onto the control circuit board.

FIGS. 16 and 17 are diagrams illustrating how other members are assembled onto the control circuit board 80 in detail. Insertion-type input/output terminal(s), e.g., an HDMI (registered trademark) connector and an RGB connector, for use in external input and output are mounted on the control circuit board 80. When a cable terminal is externally inserted or withdrawn to or from the input/output terminal, an insertion or withdrawal force is applied to the input/output terminal. Because the control circuit board 80 is fixed to the DMD PCB 42 on which the DMD 41 is mounted and to the optical illuminating unit 31, this force can be applied to the connector 82, with which the control circuit board 80 is connected to the DMD PCB 42, and the optical illuminating unit 31, causing a damage to or contact failure at the connector 82 to occur. Resultant adverse effects such as an increase in electrical noise, and degradation in positional accuracy of optical elements including the lenses and the mirrors in the optical illuminating unit 31 and positional accuracy of the DMD 41 can lead to a problem such as image deformation.

However, in this embodiment, a screw hole is defined in the input/output terminal, e.g., the HDMI (registered trademark) connector and the RGB connector, and the input/output terminal is fastened to a PCB bracket 90 (second retaining member) with a screw. This structure causes all force which is applied due to externally insertion or withdrawal of a cable terminal to and from the connector to be received by the PCB bracket 90. Because the PCB bracket 90 is fixed to a housing or the like of the image projection apparatus 1 but not fixed to the optical illuminating unit 31, the insertion or withdrawal force is prevented from being applied to optical elements where positional accuracy is required and the connector.

The image projection apparatus 1 according to the embodiment described above is configured as follows. The DMD PCB 42 and the control circuit board 80 are ground connected to the metal earth plate 70 at the positions near connectors 42a and 82 where a large portion of electrical noise originates. The metal earth plate 70 is connected to the metal member, which has largest capacitance, of the optical illuminating unit 31. Accordingly, because electrical noise can be reduced efficiently, an increase in size of the image projection apparatus 1 can be reduced.

Meanwhile, most of electrical noise originates from the front side and the back side of the DMD PCB 42 including the image display device, such as the DMD 41, at a front side and a back side of near the connector 42a. Bringing the grounding elastic members made of metal into contact with the front side and the back side can increase electrical-noise reducing capability.

According to one embodiment of the present invention, an image projection apparatus generates less electrical noise than conventional image projection apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus for projecting an image onto a projection surface, the image projection apparatus comprising:
    a light source device configured to emit light;
    a first circuit board including an image display device configured to form an image using the light, a connector, and an electrically conductive portion near the connector;
    a retaining member made of metal;
    an optical illuminating unit held by the retaining member and configured to guide the light emitted from the light source device to the image display device;
    an optical projecting unit configured to project the image formed by the image display device onto the projection surface;
    a second circuit board configured to be electrically connected to the connector of the first circuit board;
    a metal plate fixed and electrically connected to the retaining member; and
    an elastic metal member arranged on the metal plate, wherein
    the first circuit board is fixed to the retaining member,
    the elastic metal member is in contact with the electrically conductive portion of the first circuit board, and
    the second circuit board is fixed and electrically connected to the metal plate.

2. The image projection apparatus according to claim 1, wherein
    the electrically conductive portion, with which the elastic metal member is in contact and which is near the connector, includes a plurality of the electrically conductive portions, and
    at least one of the electrically conductive portions is on a front side of the first circuit board and other one or more of the electrically conductive portions are on a back side of the first circuit board.

3. The image projection apparatus according to claim 1, wherein
    the elastic metal member includes a plurality of the elastic metal members,
    the plurality of the elastic metal members is fixed to the metal plate, and
    the plurality of elastic metal members is identical to each other in shape.

4. The image projection apparatus according to claim 1, further comprising
    a second retaining member independent of the retaining member, wherein
    an insertion-type input/output terminal having a screw hole is mounted on the second circuit board,
    the input/output terminal is fixed to the second retaining member with a screw fastened through the screw hole, and
    the retaining member and the second retaining member are not fixed to each other.

5. A circuit-board retaining structure comprising:
a first circuit board including an image display device configured to form an image using light, a connector, and an electrically conductive portion near the connector;
a retaining member made of metal;
a second circuit board configured to be electrically connected to the connector of the first circuit board;
a metal plate fixed and electrically connected to the retaining member; and
an elastic metal member arranged on the metal plate, wherein
the first circuit board is fixed to the retaining member,
the elastic metal member is in contact with the electrically conductive portion of the first circuit board, and
the second circuit board is fixed and electrically connected to the metal plate.

* * * * *